US009694756B2

United States Patent
Pullman et al.

(10) Patent No.: US 9,694,756 B2
(45) Date of Patent: Jul. 4, 2017

(54) DROP DOWN LADDER RACK

(71) Applicant: Knaack LLC, Crystal Lake, IL (US)

(72) Inventors: Marc Pullman, St. Charles, IL (US); Joe Montgomery, McHenry, IL (US); Leigh Taylor Roto, Palatine, IL (US)

(73) Assignee: Knaack LLC, Crystal Lake, IL (US)

( * ) Notice: Subject to any disclaimer, the term of this patent is extended or adjusted under 35 U.S.C. 154(b) by 176 days.

(21) Appl. No.: 14/717,088

(22) Filed: May 20, 2015

(65) Prior Publication Data

US 2016/0023613 A1     Jan. 28, 2016

Related U.S. Application Data

(60) Provisional application No. 62/028,126, filed on Jul. 23, 2014, provisional application No. 62/074,188, filed on Nov. 3, 2014.

(51) Int. Cl.
*B60R 9/045*     (2006.01)
*B60R 9/042*     (2006.01)

(52) U.S. Cl.
CPC ............ *B60R 9/0423* (2013.01); *B60R 9/045* (2013.01)

(58) Field of Classification Search
CPC .............................. B60R 9/0423; B60R 9/045
(Continued)

(56) References Cited

U.S. PATENT DOCUMENTS 1,932,099 A * 10/1933 Cabana .................. A47L 13/252
                                                    15/143.1
3,963,136 A    6/1976 Spanke
(Continued)

FOREIGN PATENT DOCUMENTS

AU     2003231667    2/2004
CA     2535688       8/2007
(Continued)

OTHER PUBLICATIONS

Adrian Steel Drop Down Ladder Rack on Nissan NV High Roof Van https://www.youtube.com/watch?v=wkz7arSbegE—published on Jun. 5, 2011.
(Continued)

*Primary Examiner* — Corey Skurdal
(74) *Attorney, Agent, or Firm* — McDonnell Boehnen Hulbert & Berghoff LLP

(57) ABSTRACT

A drop down ladder rack is disclosed. The ladder rack has a first assembly and a second assembly configured to be mounted on top of a vehicle. The assemblies are coupled to a connecting rod, which is rotatable. The assemblies move between a first, raised position and a second, lowered position. Each of the first and second assemblies comprises a first support member fixedly secured to the vehicle, a second load carrying member configured to be slideably engaged with a first end of the first support member, and a third actuation member configured to enable the second load carrying member to move with respect to the first support member. A first end of the third actuation member is connected to the connecting rod by a drive rod and a second end of the third actuation member is pivotably connected to the second load carrying member, thereby enabling the second load carrying member to move with respect to the first support member. The first assembly further comprises a downwardly extending arm attached to the second load carrying member to lower the first assembly to a third, fully extended position.

24 Claims, 15 Drawing Sheets

(58) Field of Classification Search
USPC .......................................................... 224/310
See application file for complete search history.

(56) References Cited

U.S. PATENT DOCUMENTS

| | | | |
|---|---|---|---|
| 4,826,387 A | 5/1989 | Audet | |
| 5,058,791 A * | 10/1991 | Henriquez | B60R 9/0423 |
| | | | 224/310 |
| 5,297,912 A | 3/1994 | Levi | |
| 5,398,778 A | 3/1995 | Sexton | |
| 5,505,579 A | 4/1996 | Ray et al. | |
| 5,850,891 A | 12/1998 | Olms et al. | |
| 5,884,824 A | 3/1999 | Spring, Jr. | |
| 6,092,972 A | 7/2000 | Levi | |
| 6,099,231 A | 8/2000 | Levi | |
| 6,105,840 A | 8/2000 | Trevino et al. | |
| 6,158,638 A | 12/2000 | Szigeti | |
| 6,202,807 B1 | 3/2001 | Levi | |
| 6,315,181 B1 | 11/2001 | Bradley et al. | |
| 6,360,930 B1 | 3/2002 | Flickenger | |
| 6,427,889 B1 | 8/2002 | Levi | |
| 6,428,263 B1 | 8/2002 | Schellens | |
| 6,520,393 B1 | 2/2003 | Ferguson | |
| 6,561,396 B2 | 5/2003 | Ketterhagen | |
| 6,679,407 B2 | 1/2004 | Weeks | |
| 6,764,268 B2 | 7/2004 | Levi | |
| 6,854,627 B2 | 2/2005 | Foo et al. | |
| 6,925,686 B2 * | 8/2005 | Heathcock | B25G 1/04 |
| | | | 15/144.4 |
| 6,971,563 B2 | 12/2005 | Levi | |
| 7,097,409 B2 | 8/2006 | Richter | |
| 7,108,162 B2 | 9/2006 | Stadler et al. | |
| 7,341,418 B2 | 3/2008 | Ito | |
| 7,549,831 B2 | 6/2009 | Hendley et al. | |
| 7,780,050 B2 * | 8/2010 | Tucker | B60R 9/042 |
| | | | 224/309 |
| 8,322,580 B1 | 12/2012 | Hamilton | |
| 8,511,525 B1 | 8/2013 | Levi | |
| 8,991,889 B1 * | 3/2015 | Levi | B60R 9/0423 |
| | | | 224/310 |
| 9,327,654 B2 * | 5/2016 | Richter | B60R 9/0423 |
| 2002/0090285 A1 * | 7/2002 | Levi | E06C 5/00 |
| | | | 414/462 |
| 2003/0175101 A1 | 9/2003 | Levi | |
| 2004/0028510 A1 | 2/2004 | Jones | |
| 2004/0047716 A1 | 3/2004 | Hendley et al. | |
| 2004/0091344 A1 | 5/2004 | Balkins et al. | |
| 2006/0065685 A1 | 3/2006 | Fitzsimmons | |
| 2006/0099059 A1 | 5/2006 | Ervin | |
| 2006/0133914 A1 | 6/2006 | Derks | |
| 2006/0228200 A1 | 10/2006 | McLoughlin et al. | |
| 2007/0090139 A1 | 4/2007 | McKenzie | |
| 2007/0183875 A1 | 8/2007 | Thibault | |
| 2009/0140021 A1 * | 6/2009 | Richter | E06C 5/04 |
| | | | 224/310 |
| 2013/0202395 A1 | 8/2013 | Levi | |
| 2013/0334267 A1 | 12/2013 | Saitter, Jr. et al. | |
| 2014/0030054 A1 | 1/2014 | Levi | |
| 2014/0064893 A1 | 3/2014 | Thibault | |

FOREIGN PATENT DOCUMENTS

| | | |
|---|---|---|
| EP | 0340076 | 11/1989 |
| EP | 0348362 | 12/1989 |
| EP | 0796763 | 9/1997 |
| FR | 2654688 | 5/1991 |
| GB | 2360751 | 10/2001 |
| GB | 2454680 | 5/2009 |
| GB | 2468660 | 9/2010 |
| WO | 2012/044280 | 4/2012 |
| WO | 2012122130 | 9/2012 |

OTHER PUBLICATIONS

European Search Report for EP app. 15177557.4 mailed Dec. 15, 2015.

* cited by examiner

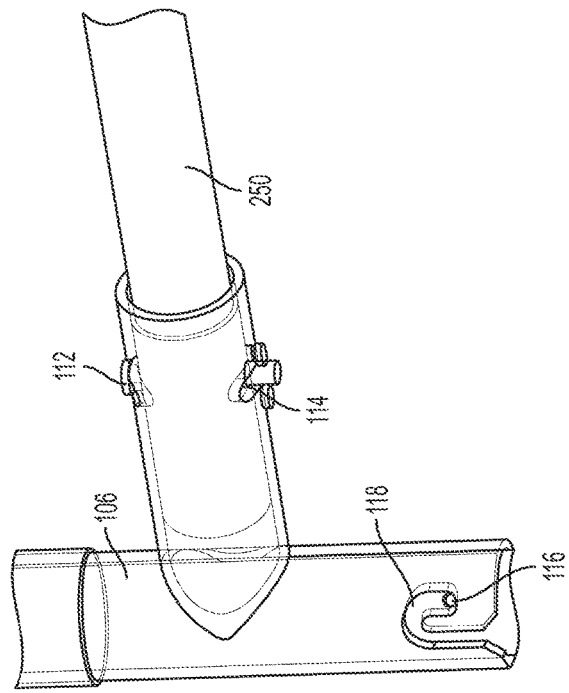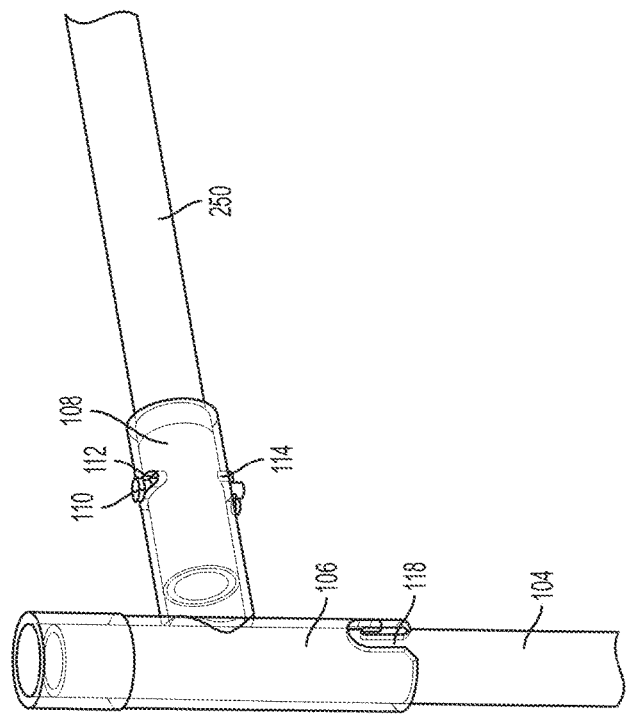

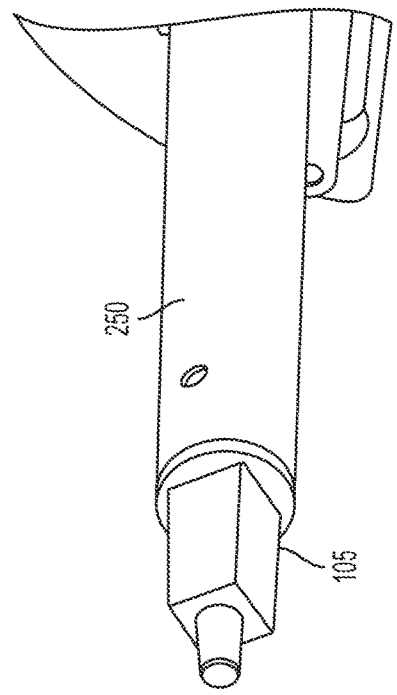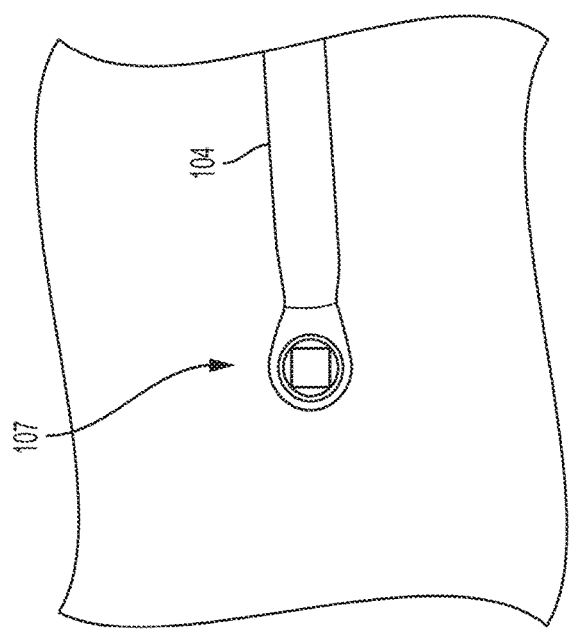
FIG. 8A
FIG. 8B

DROP DOWN LADDER RACK

CROSS-REFERENCE TO RELATED APPLICATIONS

This application claims priority to U.S. provisional application No. 62/028,126 filed Jul. 23, 2014 and U.S. provisional application No. 62/074,188 filed Nov. 3, 2014. The entire content of both of these applications is hereby incorporated by reference in their entirety.

BACKGROUND

A. Field

This disclosure relates generally to ladder racks, and more specifically to drop down ladder racks configured to moveably support a ladder upon a vehicle, such as a van.

B. Description of Related Art

It is a common practice to transport ladders on vehicles such as vans and pick-up trucks. Generally, positioning ladders on top of such vehicles, and getting them down, can be awkward and difficult. For example, one end of the ladder at a time is ordinarily placed on a rack. Therefore, maintaining the first end in place while positioning the other end of the ladder can present difficulties. Further, loading and unloading of the ladders from roof-mounted racks requires lifting of heavy, cumbersome ladders, which may result in damage to the vehicle or ladder, or strain or injury to the person attempting to load and unload the ladder. Some ladder racks also require manipulation of the ladder rack itself after a ladder has been loaded on the rack.

Thus, it would be desirable to provide a ladder rack that is straightforward to use and that facilitates the loading and unloading of the ladder onto the top of a vehicle, and also allows for easy access to the ladder.

SUMMARY

The following embodiments and aspects thereof are described and illustrated in conjunction with systems, tools and methods which are meant to be exemplary and illustrative, not limiting in scope.

In one aspect, a drop down ladder rack is described. The ladder rack has a first assembly and a second assembly configured to be mounted on a top of a vehicle. The first assembly and the second assembly are operatively coupled to a connecting rod. The first and second assemblies are configured to move between a first, raised position and a second, lowered position. Each of the first and second assemblies comprises a support member configured to be fixedly secured to the vehicle, the support member having a first end and a second end, a load carrying member configured to be slideably engaged with the first end of the support member, and an actuation member having a first end and a second end. The first end of the actuation member is connected to a drive rod, the second end of the actuation member is connected to the load carrying member, and the actuation member is configured to enable the load carrying member to move with respect to the support member. The drive rod is coupled to the connecting rod. The first assembly further comprises a downwardly extending arm attached to the load carrying member and configured to lower the first assembly into a third, fully extended position.

In another embodiment, the ladder rack includes a first assembly and a second assembly configured to be mounted on a top of a vehicle. The first assembly and the second assembly are connected by a connecting rod. The first and second assemblies are configured to move between a first, raised position and a second, lowered position. The ladder rack further includes an elongated handle operatively coupled to the connecting rod, which is configured to aid in the raising and lowering of the first and second assemblies. Each of the first and second assemblies comprises a first member configured to be fixedly secured to the vehicle, the first member having a first end, a second end, and a bearing member coupled to the first end, a second member configured to engage with the first member, and a third member coupled to a drive rod and to the second member. The drive rod is connected to the connecting rod. Actuation of the third member results in the second member moving with respect to the first member. The bearing member facilitates the movement of the second member with respect to the first member.

In yet another aspect, a method of raising and lowering a ladder rack is disclosed. The method includes providing a ladder rack having a first assembly and a second assembly configured to be mounted on a top of a vehicle. The first assembly and the second assembly are connected by a connecting rod. The first and second assemblies are configured to move between a first, raised position and a second, lowered position. An elongated handle is operatively coupled to the connecting rod. Each of the first and second assemblies comprises a support member configured to be fixedly secured to the vehicle, the support member having a first end and a second end, a load carrying member configured to be engaged with the support member, the load carrying member having a first and a second end, and an actuation member configured to rotate with the connecting rod and connected to the load carrying member. The method further includes rotating the elongated handle in a first direction, thereby causing the actuation member of each assembly to rotate from a first substantially horizontal position through a vertical position to a second substantially horizontal position with respect to the support member. The rotation of each actuation member causes the respective load carrying member to slide downwardly with respect to the respective support member until the load carrying member is in the second lowered position, and the second end of each load carrying member is adjacent to the first end of the respective support member.

In addition to the exemplary aspects and embodiments described above, further aspects and embodiments will become apparent by reference to the drawings and by study of the following detailed description.

BRIEF DESCRIPTION OF THE DRAWINGS

Exemplary embodiments are illustrated in the drawings. It is intended that the embodiments and figures disclosed herein are to be considered illustrative rather than restrictive.

FIGS. 7a and 7b are close-up views of a portion of the elongated handle and the coupler shown in FIG. 1a;

FIGS. 8a and 8b are close-up views of an alternative embodiment of the elongated handle and the extension rod;

DETAILED DESCRIPTION

A drop down ladder rack for use with a vehicle is disclosed. The ladder rack includes two assemblies, each mounted on opposite sides of a top of a vehicle and connected by a connecting rod. An elongated handle is operatively coupled to the connecting rod by an extension rod to aid in the raising and lowering of the ladder rack.

Figure 1A:
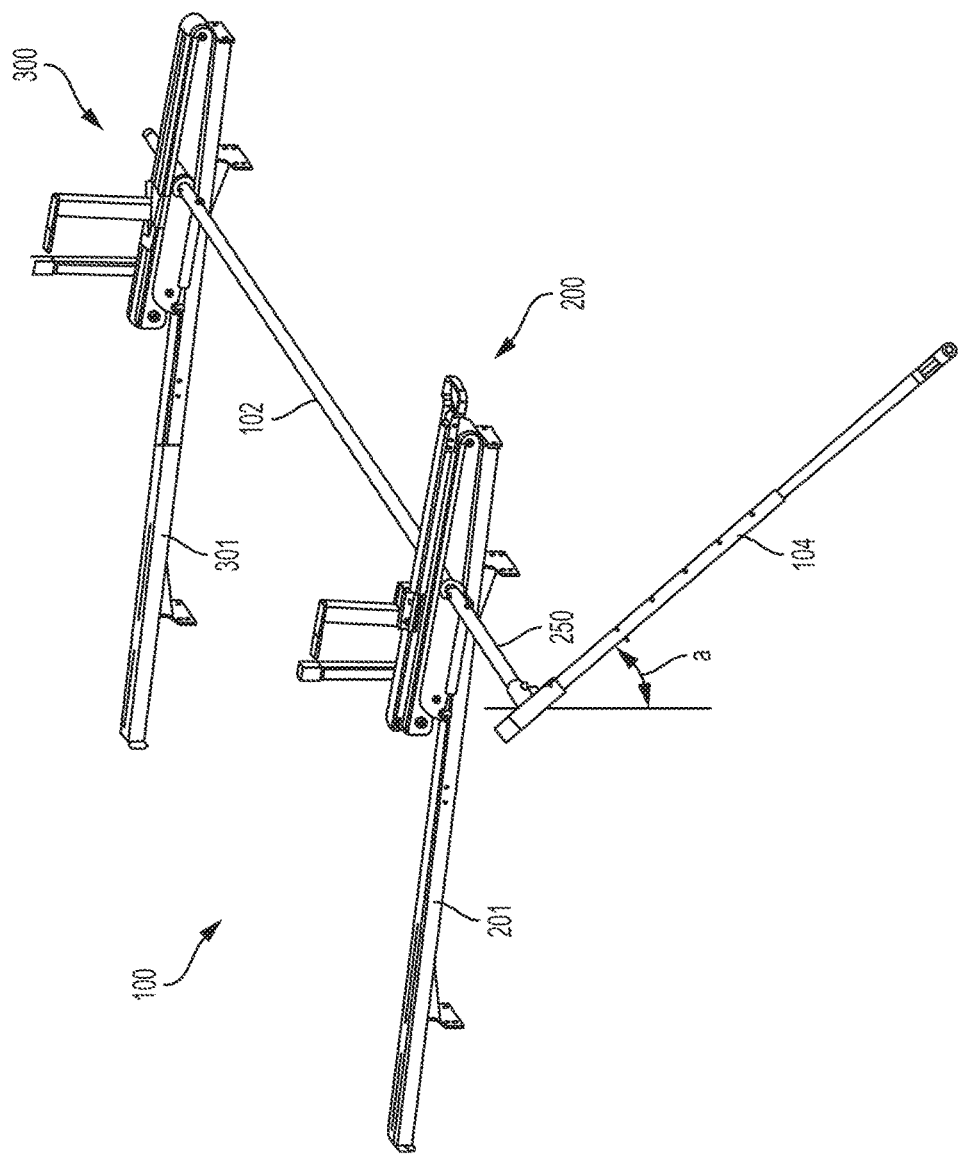
FIG. 1a is a front perspective view of the drop down ladder rack of the present application in a first or raised position.
Figure 1B:
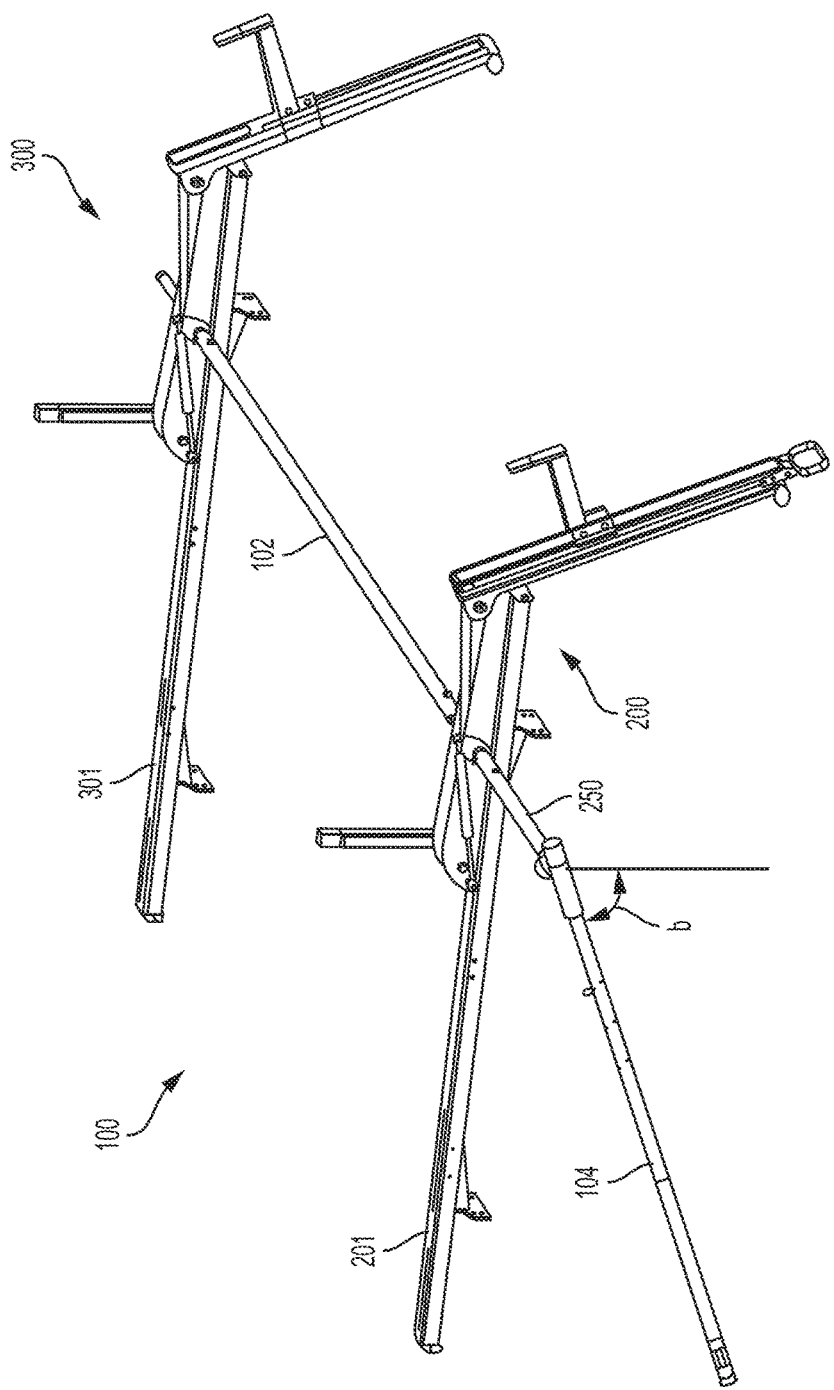
FIG. 1b is a front perspective view of the drop down ladder rack of the present application in a second or lowered position.
Figure 1C:
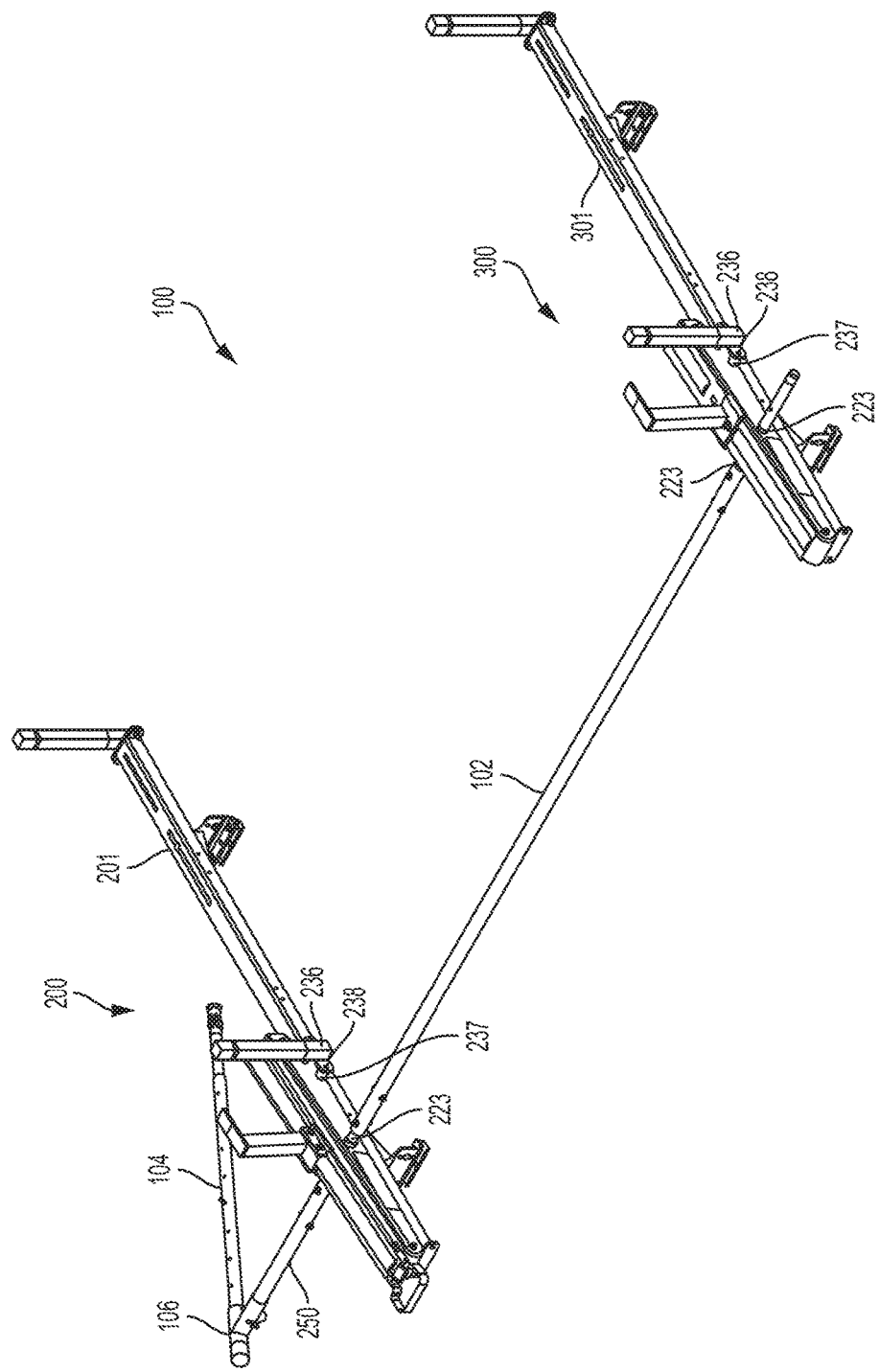
FIG. 1c is an alternate front perspective view of the drop down ladder rack of the present application on the first or raised position.
Figure 9:
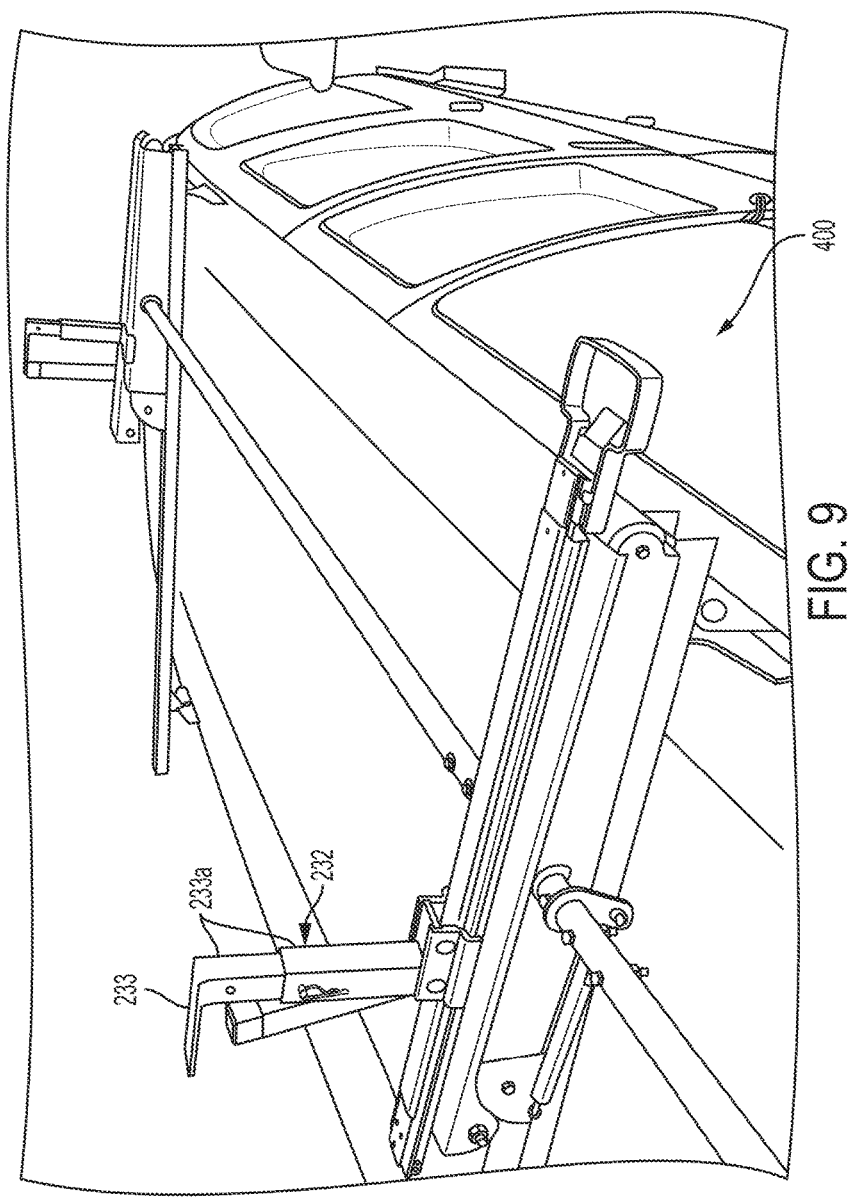
FIG. 9 shows the ladder rack of the present application secured to the top of a vehicle.

FIGS. 1a-1c show an exemplary drop down ladder rack 100 for use with a vehicle 400, such as a van (shown in FIG. 9). The ladder rack 100 is configured to mount a ladder 500 (shown in FIGS. 11 and 12) on top of the vehicle 400. In one embodiment, the drop down ladder rack 100 includes a first assembly 200 and a second assembly 300 operatively connected by a connecting rod 102. The first assembly 200 is fixedly mounted to a first rail 201, and the second assembly 300 is fixedly mounted to a second rail 301. Each rail 201, 301 is fixedly mounted to an opposite side of the top of the vehicle 400 by a suitable fastening means, such as a bracket, for example. The first and second assemblies 200, 300 include similar components, except where otherwise mentioned. An elongated handle 104 that allows a user to manually operate the ladder rack 100 is operatively connected to the connecting rod 102 by an extension rod 250, and will be described in more detail below. FIG. 1a shows the ladder rack 100 in a first, or raised position, in which a ladder would be mounted on top of the vehicle, and FIG. 1b shows the ladder rack 100 in a second, or lowered position, in which a ladder would be lowered on the side of the vehicle. The movement and operation of the ladder rack 100 is described in more detail below.

Figure 2:
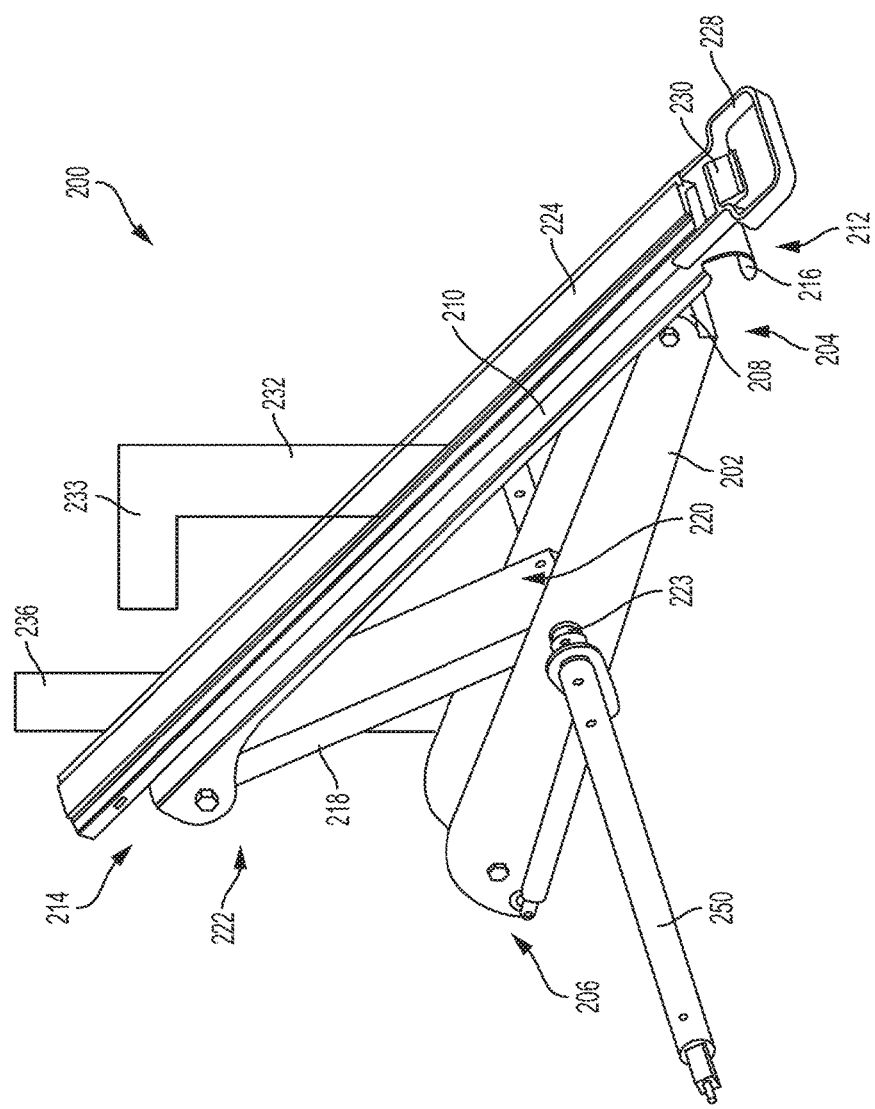
FIG. 2 is a front perspective view of one of the assemblies of the ladder rack shown in FIG. 1.
Figure 3:
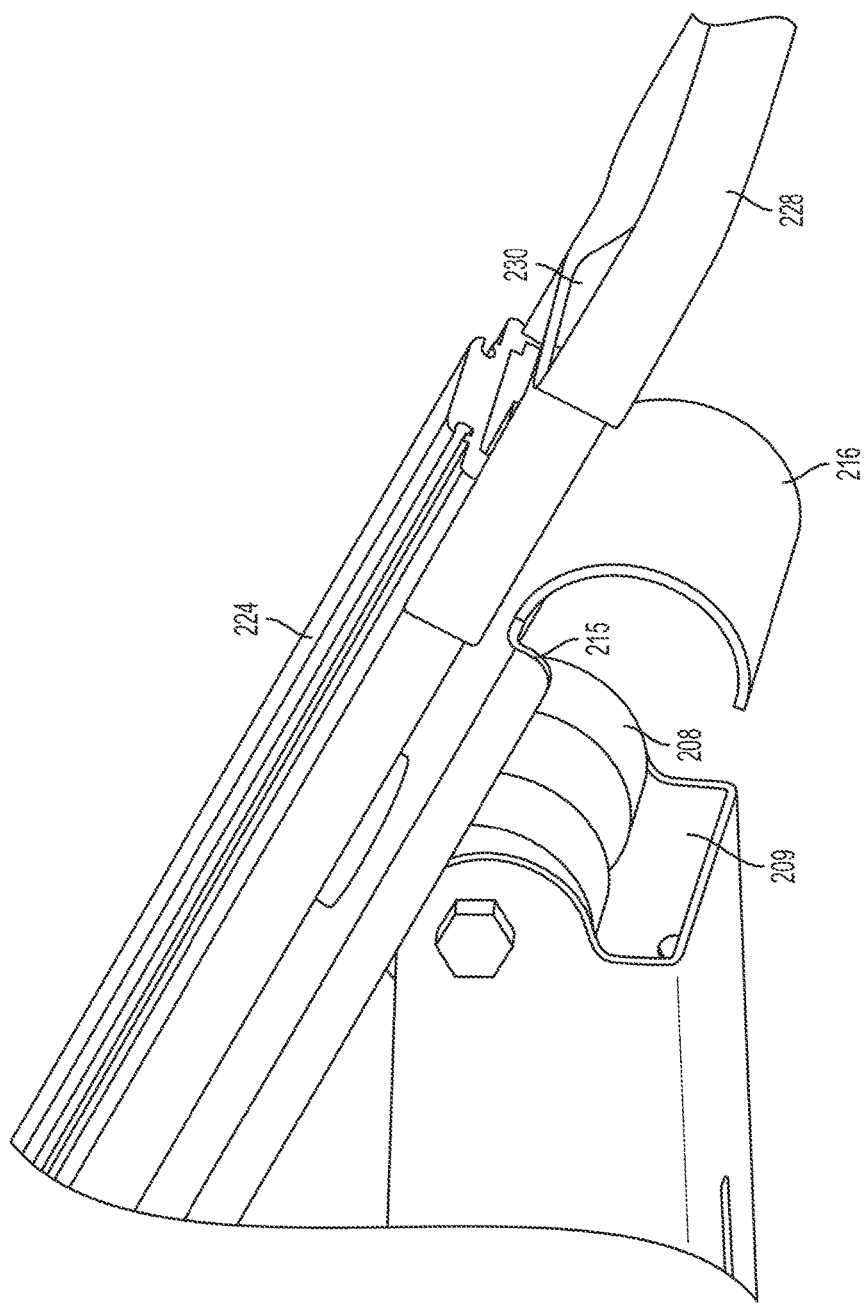
FIG. 3 is close-up view of a portion of the assembly of FIG. 2.

Referring to FIG. 2, the first assembly 200 is shown in an intermediate position between the raised position of FIG. 1a and the lowered position of FIG. 1b. The first assembly 200 includes a first or support member 202 fixedly mounted to the rail 201 on the top of the vehicle. The first member 202 has a first end 204 and a second end 206. A bearing member 208, such a roller, is located at the first end 204 of the first member 202, and is shown in detail in FIG. 3. In one embodiment, the bearing member 208 is rotatably secured to the first end 204 of the first member 202 by a fastener, such as a bolt or pin. However, it should be understood that the bearing member may be connected to the first member by any suitable fastening means. In an alternate embodiment, the bearing member may take the form of a fixed, low friction surface such as a circular bushing or rounded edge.

Figure 4:
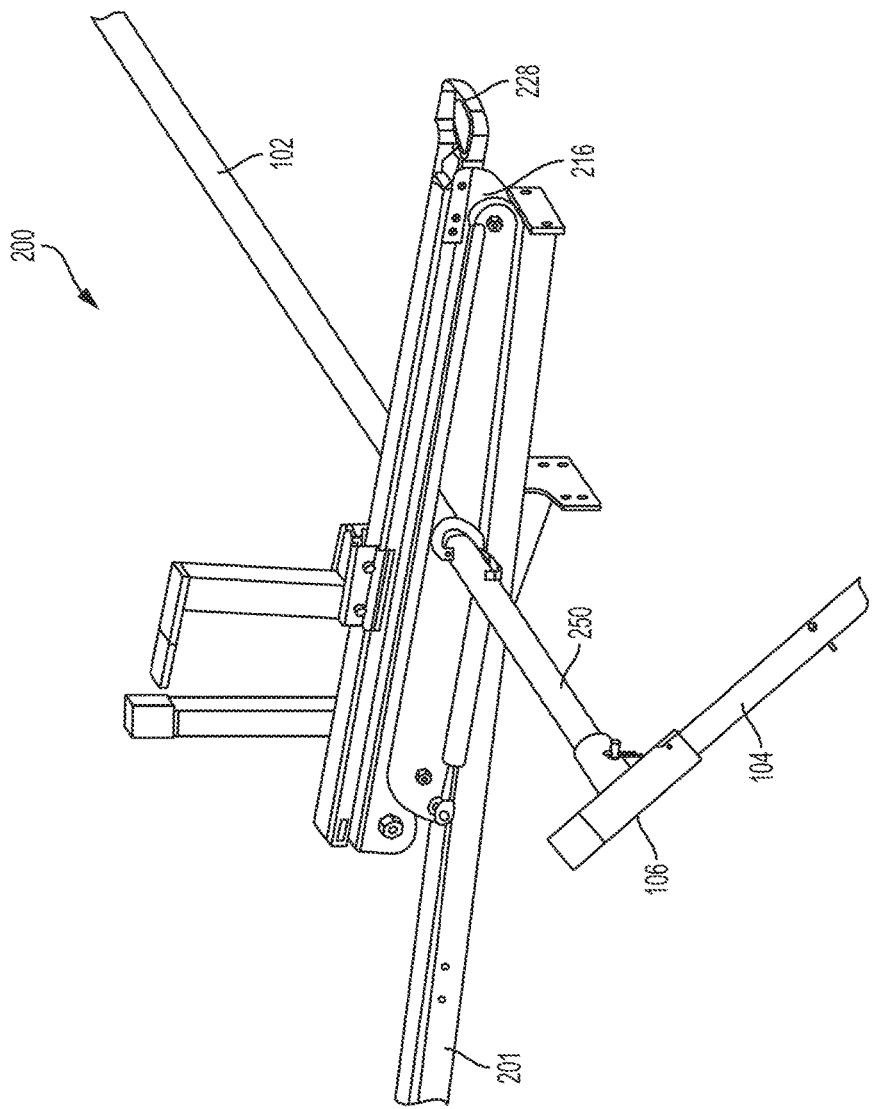
FIG. 4 is a front perspective view of the assembly shown in FIG. 2 in a closed position.

As seen in FIG. 2, the first assembly 200 includes a second or load carrying member 210 that has a first end 212 and a second end 214. As will be described in more detail below, the second or load carrying member 210 is slideably engaged with the first end 204 of the first support member 202. Specifically, the bearing member 208 facilitates sliding movement of the second, load carrying member 210 along the first end 204. The load carrying member 210 includes a rolled edge or lip 215 that assists the member 210 to guide along the first end 204 of the support member 202. Further, the second load carrying member 210 includes a locking mechanism 216 at the first end 212. In one embodiment, the locking mechanism 216 may take the form of a curved hook member that mates with a slot 209 to hold the curved hook member in place. As shown in FIG. 4, the locking mechanism 216 hooks around bearing 208 and limits movement of the assembly 200 when in a closed position. The assembly 200 is in the closed position when the ladder rack 100 is in the first or raised position (FIG. 1a).

The first assembly 200 further includes a third or actuation member 218 that operatively connects the second load carrying member 210 to the elongated handle 104 and to the connecting rod 102. The third member 218 includes a first end 220 and a second end 222. The first end 220 of the third member 218 is secured to and configured to rotate with a drive rod 223, which extends transversely across the side walls of the first support member 202. The drive rod 223 is coupled at one end to an extension rod 250 associated with the elongated handle 104 and at another end to the connecting rod 102. The second end 222 of the third actuation member 218 is pivotably connected to the second load carrying member 210. In one embodiment, the second end 222 of the third actuation member 218 is secured to the second end 214 of the second member 210 by a fastener, such as a bolt. However, it should be understood that the second member 210 may be connected to the third member 218 by any suitable fastening means.

The rotation of the drive rod 223 in clockwise direction, starting with the assembly 200 in the raised position of FIG. 1a, results in the rotation of the actuation member 218 about the drive rod 223 from a first substantially stowed position, through a vertical position, to a second, substantially horizontal position. The rotation of the actuation member 218 in turn moves the second end 214 of the second member 210 along the path of an arc. That movement causes the second member 210 to slide along the first end 204 of the first member 202 and move across the bearing member 208, to the lowered position of FIG. 1b. Similarly, rotation of the drive rod 223 in an opposite direction, starting from the lowered position of FIG. 1b and moving to the raised position of FIG. 1a, causes the load carrying member 210 to slide upwardly past the first member 204 as the actuation member 218 is rotated to the raised position.

As shown in FIG. 2, a downwardly extending arm 224 is secured to an upper surface of the second member 210. In the embodiment of FIG. 1a-1c, the downwardly extending arm 224 is provided on only the first assembly 200. In an alternate embodiment, the downwardly extending arm may be provided on the second assembly 300, rather than on the first assembly. In another embodiment, a downwardly extending arm may be provided on both the first and second assemblies. In a further embodiment intended for use with low vans, the arm 224 may not be included if not needed. As can be seen from FIG. 6, the downwardly extending arm 224 is secured to the second member 210 by a mounting plate 226, and is configured to slide along the mounting plate 226. However, it should be understood that the downwardly extending arm 224 may be connected to the second member 210 by any suitable securing means that allows for a sliding motion by the downwardly extending arm 224.

Figure 5A:
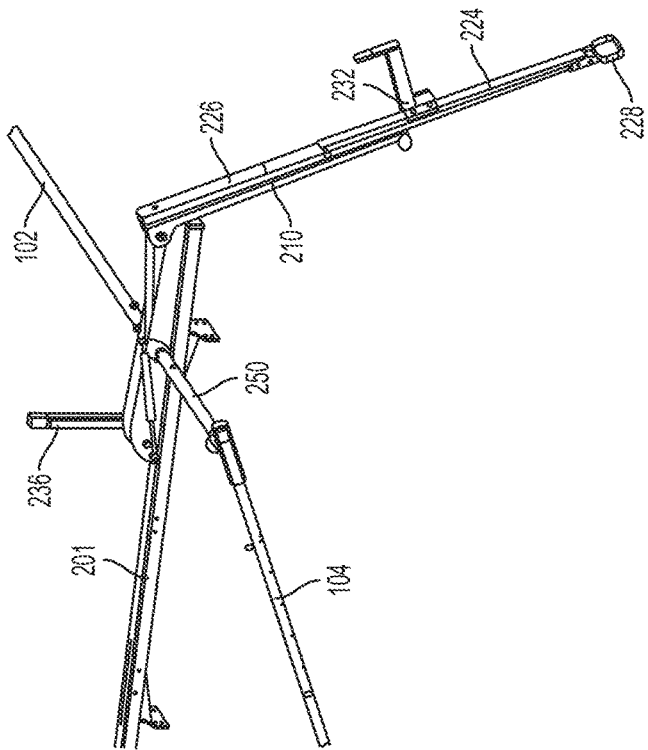
FIG. 5a is a front perspective view of the assembly shown in FIG. 2 in a partially extended position with a downwardly extending arm.
Figure 5B:
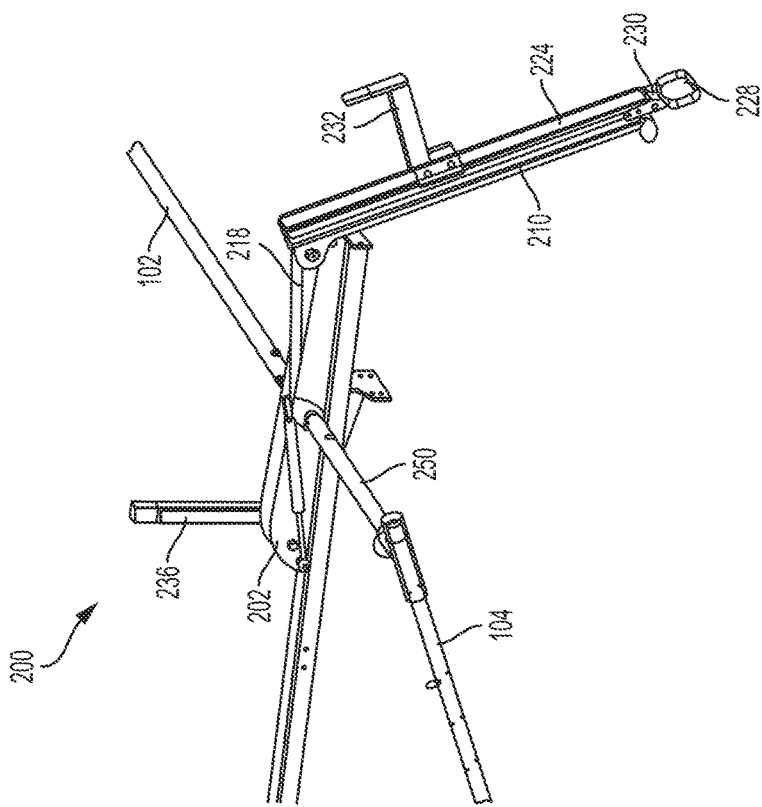
FIG. 5b is a front perspective view of the assembly shown in FIG. 2 in a fully extended position with a downwardly extending arm.
Figure 5C:
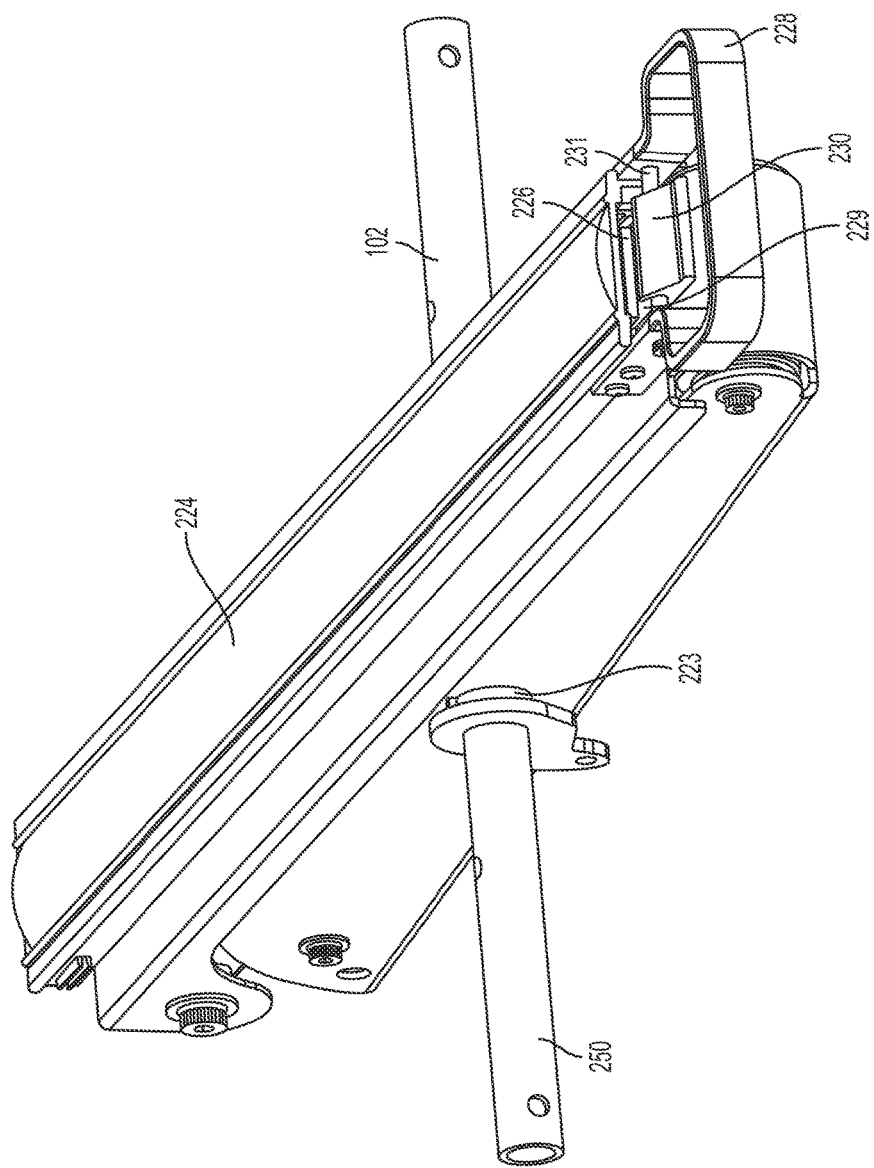
FIG. 5c is a front perspective view of the pull handle and the lever of the downwardly extending arm of the assembly of FIG. 2.

As shown in FIGS. 5a-5c, the downwardly extending arm 224 further includes a pull handle 228 and a release lever 230. The lever 230 locks and unlocks the pull handle 228. The lever 230 is attached to the mounting plate 226 by a flexible member 229. When a user actuates or pushes on the lever 230, the pull handle 228 is unlocked from its engagement with the second member 210. As can be appreciated from FIG. 5c, when the lever 230 is pushed or depressed, it is flexed away from its engagement with a locking pin 231 that is carried on handle 228. Once the lever 230 is free from the locking pin 231, the downwardly extending arm 224 may then be slid downwardly along the second member 210 via the mounting plate 226 to its fully extended position, as shown in FIG. 5b, which is described in more detail below. When the arm 224 is in the fully extended position, any ladder carried on the assembly 200 can be more easily accessible to a user.

Figure 6:
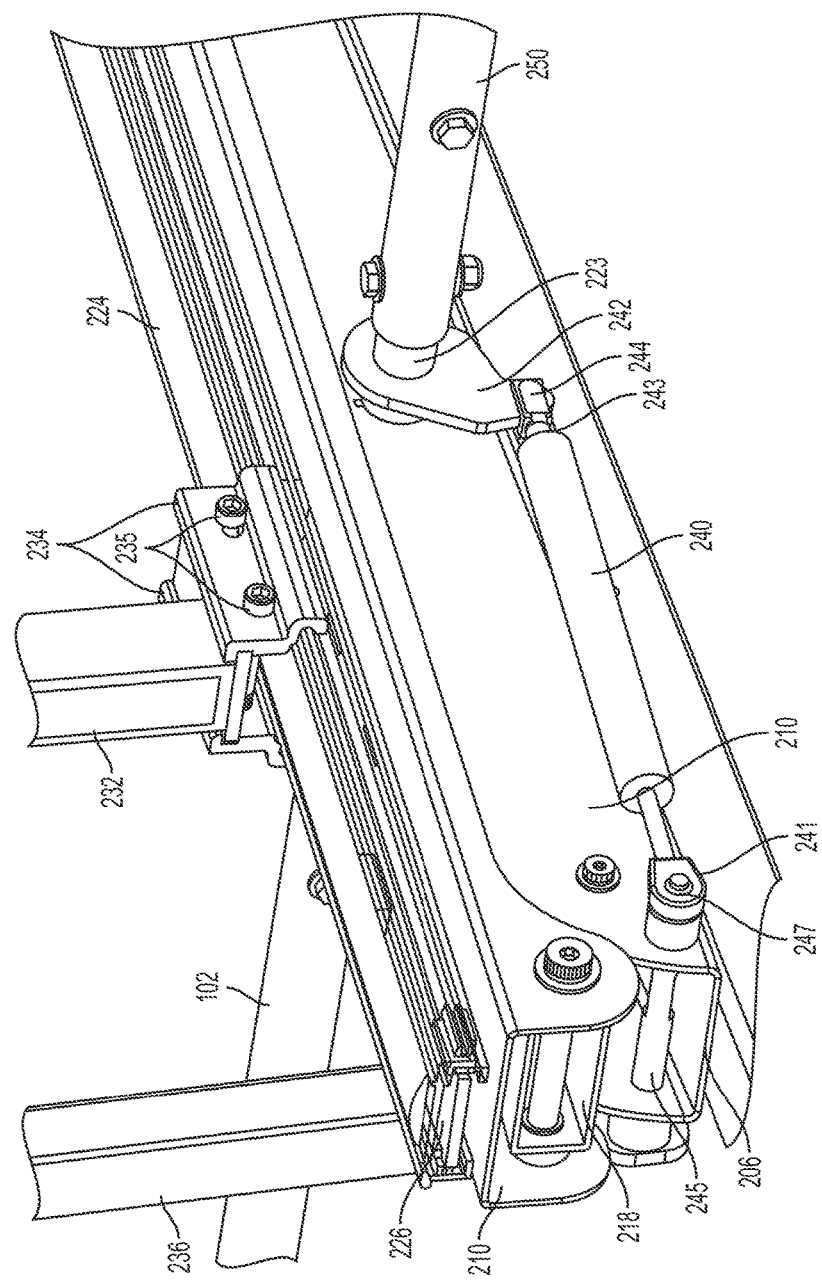
FIG. 6 is a close-up view of a portion of the assembly of FIG. 2.
Figure 10:
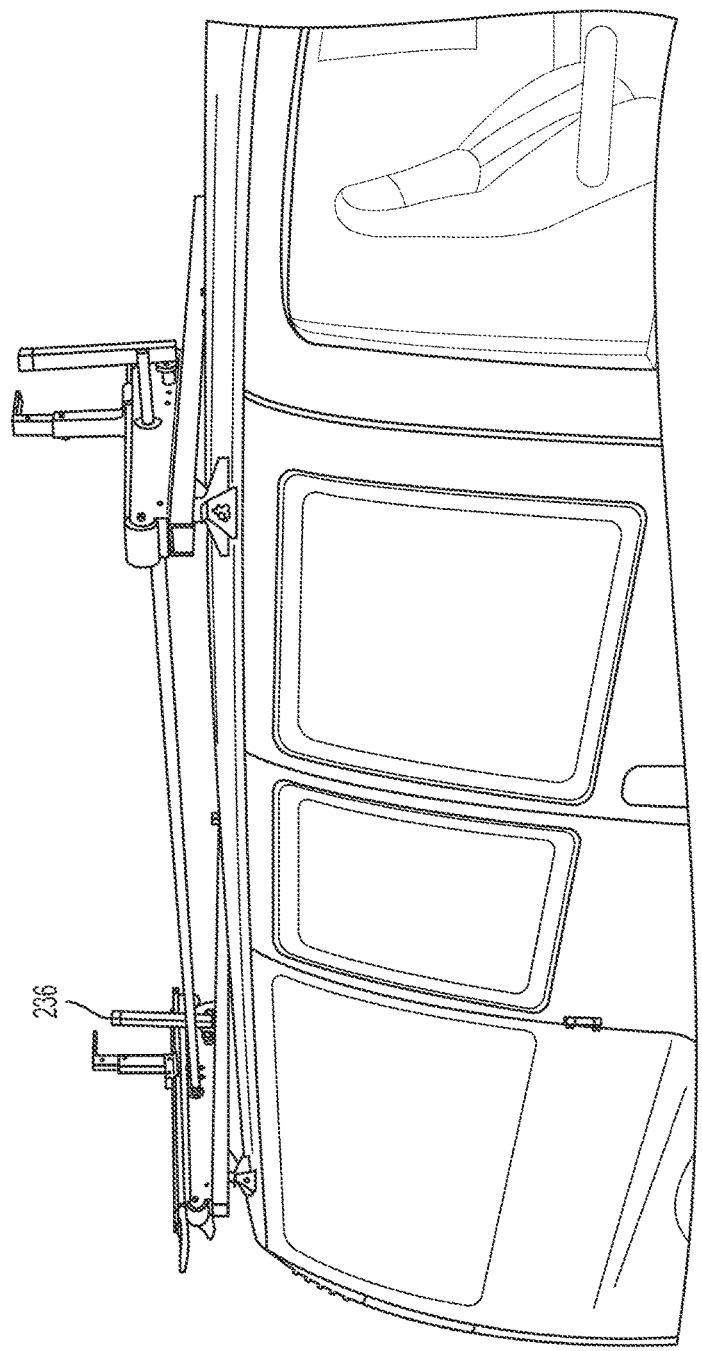
FIG. 10 shows another view of the ladder rack of the present application secured to the top of a vehicle.

Referring again to FIG. 2, a ladder hook 232 is secured to the downwardly extending arm 224 of the first assembly 200. Since second assembly 300 does not include a downwardly extending arm 224, the ladder hook of the second assembly 300 is secured directly to its second member 210. The ladder hook 232 includes an arm 233 extending perpendicularly therefrom. The location of the arm 233 can be positioned at any location along the ladder hook 232 to accommodate different sized ladders and user preference. In order to do so, a telescoping feature 233a is provided on the ladder hook, as can be seen in FIGS. 9 and 10, to allow the position of the arm 233 to be varied. In this embodiment, a number of holes are provided along the arm 233 and a pin is provided through a section of the hook 232. To place the arm at the desired length, the pin extends through the corresponding set of holes in the arm 233 and the hook 232. Thus, the ladder hook 232 may be adjusted to various lengths to allow for different ladder rail heights to be held in the ladder rack 100. Further, as best seen in FIG. 6, the ladder hook 232 is connected to the downwardly extending arm 224 with a number of brackets 234 and fasteners 235. However, it should be understood that the ladder hook 232 may be connected to the downwardly extending arm 224 by any suitable fastening means.

The ladder hook 232 is configured to carry a ladder on a respective assembly and interacts with an upstanding member 236 to retain the ladder in place. As can be seen in FIG. 1c, the upstanding member 236 may be secured to the first support member 202 by a number of bushings 237 and fasteners 238. However, it should be understood that the upstanding member 236 may be secured to the first support member 202 by any suitable securing means.

The connecting rod 102 extends along a length of the vehicle on which the rack is mounted and is operatively coupled to both the first and second assemblies 200, 300. As can be seen in FIGS. 1a and 1b, connecting rod 102 extends between the first support member 202 of each assembly. Further, each first member 202 is provided with the drive rod 223 that extends therethrough. The connecting rod 102 is coaxial with and operatively coupled to the drive rod 223 of each assembly. Rotation of the drive rod 223 of the first assembly 200 causes corresponding rotation of the connecting rod 102, which in turn causes corresponding rotation of the drive rod 223 of the second assembly 300.

Referring again to FIG. 6, the first assembly 200 further includes a standard gas damper 240 and a cam 242. The damper 240 functions to dampen both drop down and return actions of the first assembly 200. In the embodiment of FIG. 6, one end of the damper 240 is attached via a first fastener or endpiece 241 to the second end 206 of the first member 202. Specifically, the damper end piece 241 attaches to a damper rod 245 and is retained in place with an "E" clip 247. A second end of the damper 240, in the form of a clevis 243, is attached to the cam 242 via a suitable fastener 244 that snaps into place. The cam 242 in turn is operatively coupled to the drive rod 223, which in turn is coupled to the extension rod 250. In an alternate embodiment, any known fastening means may be used to secure the damper to the first, support member and to the cam. The second assembly 300 includes the same damper and cam arrangement as the first assembly 200.

The ladder rack 100 is provided with an elongated handle 104 that facilitates the raising and lowering of the rack 100 by a user. As shown in FIGS. 7a-b, the handle 104 is connected to a coupler 106. In one embodiment, the coupler 106 has a "T" shape. However, other configurations are possible as well. One end of the elongated handle 104 slides into the bottom of the coupler 106 and engages to the coupler 106 with a pin or other suitable fastener 116 located on the elongated handle 104. The mating of the pin 116 with a groove 118 at the bottom of the coupler 106 allows the elongated handle 104 to be held in place during operation. Further, the coupler 106 operatively couples the handle 104 to one end of the extension rod 250. Specifically, the coupler 106 attaches to an extension fitting 108 that is provided at one end of the extension rod 250, and is retained in place by a fastener 110, such as a pin or bolt. In one embodiment, slots 112, 114 are provided on a top and a bottom surface of the coupler 106, and the fastener pin 110 extends through the slots 112, 114 to retain the coupler 106 on the extension fitting 108 of the extension rod 250. The fastener pin 110 may be retained by a nut or locking clip, for example. It should be understood that other suitable fastening means may alternatively be used to retain the coupler to the extension fitting and the extension rod. Further, the elongated handle 104 is extendable in length. As seen in FIG. 1a-1c, the handle 104 may be provided with a telescopic feature so that its length may be adjusted in order to accommodate a particular user.

In an alternate embodiment shown in FIGS. 8a and 8b, the extension rod 250 may be connected to the elongated handle 104 by a ratcheting mechanism 105, instead of a coupler. A cooperating ratcheting device 107 located on the elongated handle 104 interacts with the ratcheting mechanism 105 on one end of the extension rod 250. Specifically, the ratcheting device 107 is fitted over the ratcheting mechanism 105. A user may then rotate the elongated handle 104 in one direction to raise the ladder rack 100 and in the opposite direction to lower the ladder rack 100. Once the ladder rack 100 is in its ascent or its descent, the ratcheting action will prevent the elongated handle 104 from pulling out of the user's hand.

The extension rod 250, the drive rods 223, and the connecting rod 102 are coupled so that rotation of the extension rod 250 results in rotation of both of the drive rods 223 and the connecting rod 102. As can be seen from FIGS. 1c and 6, one end of the extension rod 250 is mounted on one end of the drive rod 223 of the first assembly 200. The other end of the drive rod 223 is coupled to one end of the connecting rod 102. The other end of the connecting rod 102 is coupled to the drive rod 223 of the second assembly 300. The rods are coupled by suitable fasteners. Rotation of the handle 104 causes rotation of the extension rod 250, which in turn causes rotation of the drive rod 223 in the first assembly 200, thereby causing rotation of the connecting rod 102, which finally causes rotation of the drive rod 22 in the second assembly 300. To accommodate different sizes of vehicles, the connecting rod and the extension rod may come in variable lengths.

When the ladder rack 100 is in the first or raised position, shown in FIG. 1a, the elongated handle 104 is positioned in a first orientation with respect to the extension rod 250 and the connecting rod 102. In the first orientation, the handle 104 is at an angle a, which is approximately 30 degrees (±10 degrees) with respect to vertical. To move the ladder rack 100 to the second or extended position, shown in FIG. 1b, a user rotates the elongated handle 104 in a first direction to a second orientation. In this second orientation, the handle 104 is at an angle b, which is approximately 30 degrees (±10 degrees) with respect to vertical. To move the ladder rack 100 back to the first orientation, a user rotates the elongated handle 104 in a second direction, which is generally opposite to the first direction. In one embodiment, the first direction is counterclockwise and the second direction is clockwise.

The elongated handle 104 is extended when it is desired to lower or raise the ladder rack 100. When not in use, the elongated handle 104 may be collapsed to a non-extended state, removed from the coupler, and stored in the vehicle or elsewhere.

Figure 11:
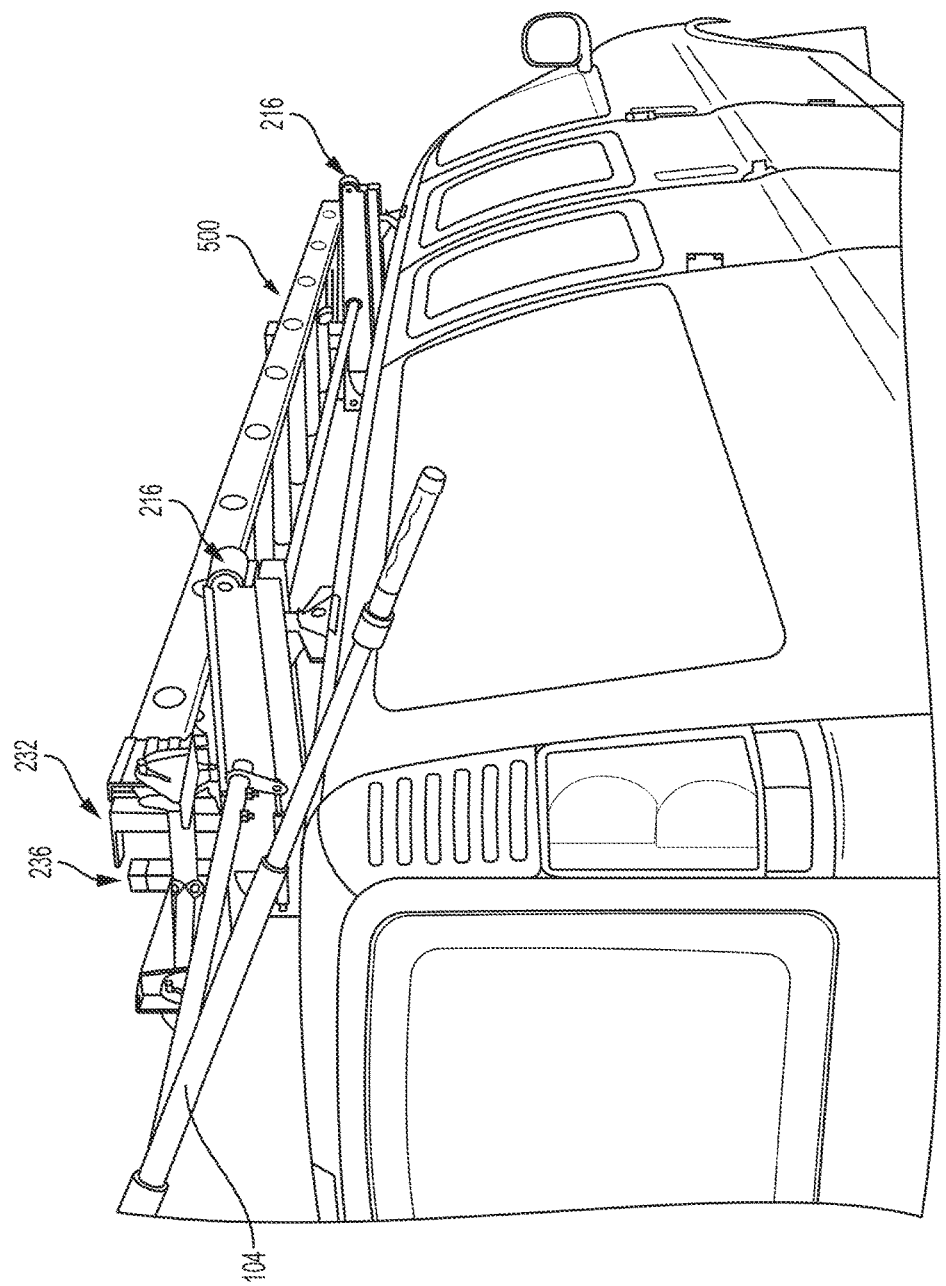
FIG. 11 shows a ladder in use with the ladder rack of the present application in a first or raised position.
Figure 12:
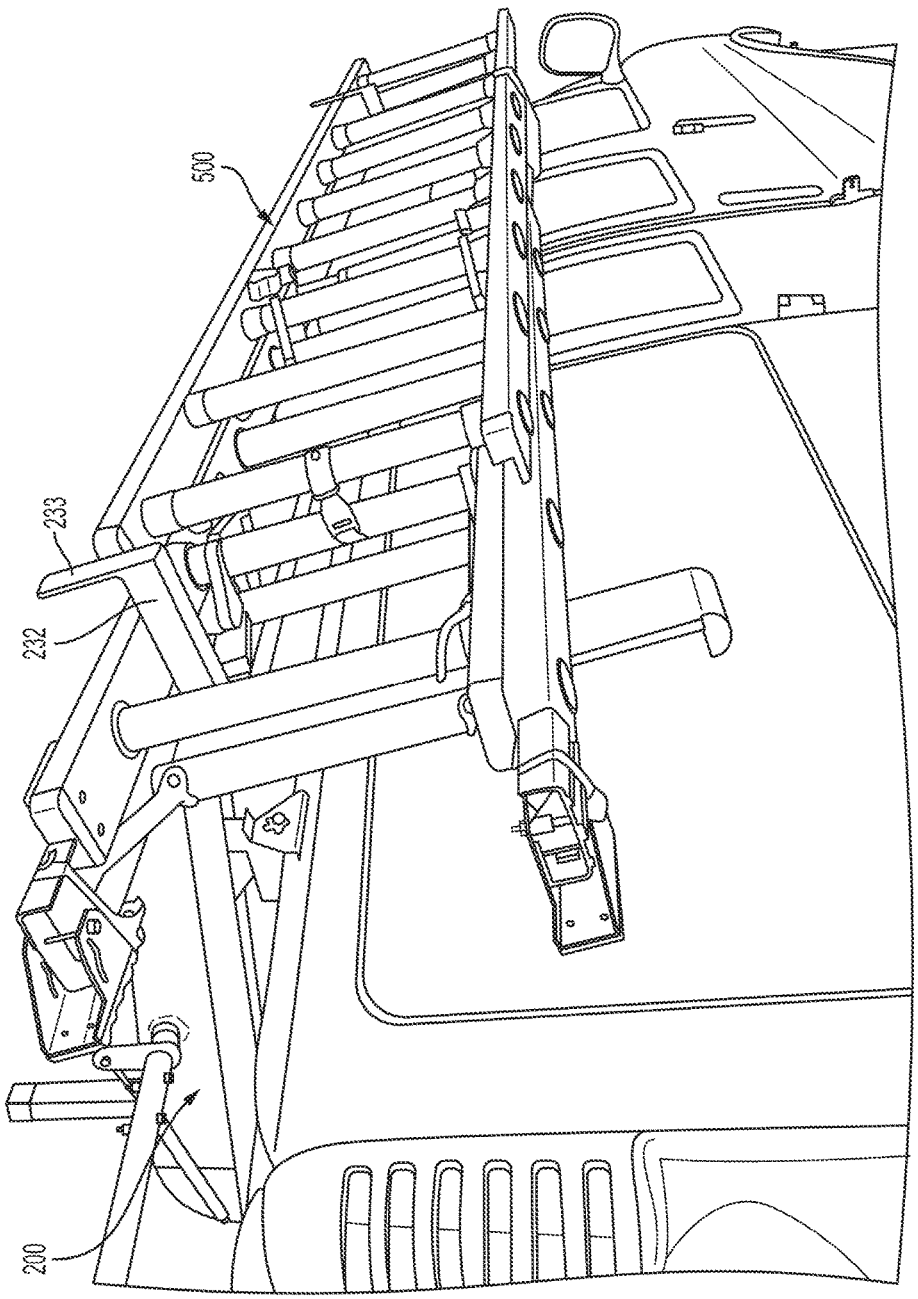
FIG. 12 shows a ladder in use with the ladder rack of the present application in a second or lowered position.

In operation, a ladder 500 is positioned on the ladder rack 100 on the top of a vehicle 400, such as a van, as shown in FIG. 11. The ladder 500 is held in place on the ladder rack 100 by the ladder hook 232 and upstanding member 236. Further, the locking mechanisms 216 lock the assemblies 200, 300 when the ladder rack 100 is in the first, raised position.

The ladder rack 100 is in a first, raised position where the assemblies 200, 300 are closed and positioned on top of the vehicle 400, as shown in FIGS. 9 and 10. As mentioned above, in the raised position, the elongated handle 104 is positioned in a first orientation, as shown in FIG. 1a. In order to lower the ladder rack 100, a user rotates the elongated handle 104 in a first direction to a second orientation. This rotation of the handle causes rotation of the extension rod 250, the drive rod 223 of the first assembly 200, the connecting rod 102, and the drive rod 223 of the second assembly 300. The rotation of the handle causes the third members 218 to rotate and to move upwardly from a first substantially horizontal, stowed position, through a vertical position, to a second, substantially horizontal position with respect to the first members 202. The second members 210 slide downwardly along bearing members 208 and move to the second, lowered position where the second end 222 of the third members 218 and the second end 214 of the second members 210 are located adjacent to the first end 204 of the first members 202, as shown in FIGS. 1b and 5a. In the second, lowered position, shown in FIG. 12, the ladder 500 rests on the ladder hooks 232 of the ladder rack 100. The operation of both assemblies 200, 300 are identical up to this point.

When the handle 104 is rotated from its starting position with the rack in its raised position (shown in FIG. 1a), the handle 104 and coupler 106 rotate for a distance and then come to an ending position when the pin 110, after traveling a distance along the slots 112, 114, hits an end of slots 112, 114 and thus can no longer travel. In this ending position shown in FIG. 1b, the handle is approximately at 30 degrees (±10 degrees) from vertical (denoted as angle "b" in FIG. 1b). The angle of the handle 104 in the ending position is determined by the length of the slots 112, 114. Although the handle 104 stops its travel and no longer rotates, the rack continues to be lowered into the position shown in FIG. 1b. Once the handle reaches its ending position, the actuation member 218 and the load carrying member 210 continue to descend due to gravity. Specifically, once the actuation member 218 and the load carrying member 210 are rotated past the vertical position, gravity will force them to be lowered to the lowered position until the actuation member 218 comes into contact with the roller 208. The descent is controlled due to the action of the damper 240. The interaction of the slots 112, 114 on the coupler 106 with the fastener pin 110 on the extension rod 250 prevents the handle 104 and the coupler 106 from rotating past the starting and ending positions. This interaction prevents the handle 104 from rotating to a height that would be inaccessible to the user.

Once the ladder rack 100 is in the second, lowered position, a user may further lower the ladder using the downwardly extending arm 224 of the first assembly 100. A user activates or pushes on the lever 230 to release downwardly extending arm 224. Then a user may lower the pull handle 228 downwardly to lower the downwardly extending arm 224 from the second, lowered position to the fully extended position, as shown in FIG. 5b.

To raise the ladder rack 100 back to the first or raised position of FIG. 1a, a user rotates the elongated handle 104 in a second direction, opposite the first direction, thereby reversing movement of each of the first and second assemblies and raising the ladder rack 100 to the first position where the ladder is positioned on the top of the vehicle 400. As mentioned above, the handle 104 and coupler 106 rotate for a distance and then come to an ending position when the pin 110, after traveling a distance along the slots 112, 114, hits an end of slots 112, 114 and thus can no longer travel. In this ending position shown in FIG. 1a, the handle is approximately at 30 degrees (±10 degrees) from vertical (denoted as angle "a" in FIG. 1a). As mentioned above, the length of the slots 112, 114 determine the angle of the handle in the ending position. Again, although the handle 104 stops its travel and no longer rotates, the rack continues to be raised to the position shown in FIG. 1a. Once the handle 104 reaches its ending position, the actuation member 218 and the load carrying member 210 continue to move to the raised position due to gravity. Specifically, once the actuation member 218 and the load carrying member 210 are rotated past the vertical position, gravity will force them downwardly until the second end 222 of the actuation member 218 is adjacent the second end 206 of the first member 202. The damper 240 again functions to control the descent into the raised position.

To load a ladder 500 onto the ladder rack 100, first the ladder rack is moved into the lowered position, with the downwardly extending arm 224 fully extended. A user then lifts the ladder 500 onto the ladder rack 100, by first placing a rail on one end of the ladder on the ladder hook 232 on the first assembly 200, and then placing a rail on the other end of the ladder on the ladder hook on the second assembly 300. Similarly, to unload a ladder, the ladder rail is removed by lifting one end of the ladder from the ladder hook 232 of the first assembly 200, and then lifting the other end of the ladder from the ladder hook of the second assembly 300.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A ladder rack comprising:
a first assembly and a second assembly configured to be mounted on a top of a vehicle, the first assembly and the second assembly being operatively coupled to a connecting rod, wherein the first and second assemblies are configured to move between a first, raised position and a second, lowered position,
an extension rod coupled to a drive rod of the first or second assemblies;
an elongated handle secured to the extension rod, the elongated handle being configured to aid in the raising and lowering of the first and second assemblies;
wherein each of the first and second assemblies comprises:
a support member configured to be fixedly secured to the vehicle, the support member having a first end and a second end;
a load carrying member configured to be slideably engaged with the first end of the support member;
an actuation member having a first and a second end, the first end of the actuation member being connected to the drive rod, the second end of the actuation member being connected to the load carrying member, the actuation member being configured to enable the load carrying member to move with respect to the support member; and
the drive rod being coupled to the connecting rod;
wherein the ladder rack system further comprises a coupler for securing the elongated handle to the extension rod, the coupler interacting with the extension rod to limit the rotation of the handle when the first and second assemblies move between the first, raised position and the second, lowered position;
and wherein the first assembly further comprises a downwardly extending arm attached to the load carrying member and configured to lower the first assembly from the second, lowered position to a third, fully extended position.

2. The ladder rack of claim 1 wherein the load carrying member of the first assembly further comprises a mounting plate, and wherein the downwardly extending arm is configured to slide along the mounting plate to lower the first assembly into the fully extended position.

3. The ladder rack of claim 1 wherein the coupler includes a slot that interacts with a pin on the extension rod to limit the rotation of the handle when first and second assemblies move between the first, raised position and the second, lowered position.

4. The ladder rack of claim 1 wherein the coupler includes a groove and the elongated handle including a pin, wherein the pin on the elongated handle mates with the groove to hold the elongated handle in place during operation.

5. The ladder rack of claim 1 wherein each load carrying member includes a locking mechanism configured to lock the first and second assemblies when in the first, raised position.

6. The ladder rack of claim 1 further comprising a damper connected to each support member of each of the first and second assemblies to dampen the movement of the assemblies between the first, raised position and the second, lowered position.

7. The ladder rack of claim 6 wherein the damper is connected to the drive rod via a cam.

8. The ladder rack of claim 1 further comprising a ladder hook secured to the first and second assemblies, the ladder hook being configured to carry a ladder on a respective assembly.

9. The ladder rack of claim 8 further comprising an upstanding member secured to the first and second assemblies, the upstanding member configured to cooperate with the ladder hook to retain a ladder in place when in the raised position.

10. The ladder rack of claim 1 further comprising a lever and handle positioned on the downwardly extending arm, the lever being configured to release the handle and allow the arm to be lowered to the third, fully extended position.

11. The ladder rack of claim 1 wherein the elongated handle is collapsible into a non-extended state.

12. The ladder rack of claim 1 wherein the support member includes a bearing member coupled to the first end, the bearing member being configured to allow the load carrying member to move with respect to the support member.

13. The ladder rack of claim 12 wherein the bearing member is rotatable.

14. A ladder rack comprising:
a first assembly and a second assembly configured to be mounted on a top of a vehicle, the first assembly and the second assembly being coupled to a connecting rod, wherein the first and second assemblies are configured to move between a first, raised position and a second, lowered position; and
an elongated handle operatively coupled to the connecting rod, the elongated handle being configured to aid in the raising and lowering of the first and second assemblies;
wherein each of the first and second assemblies comprises:
a first member configured to be fixedly secured to the vehicle, the first member having a first end, a second end, and a bearing member coupled to the first end;
a second member configured to engage the first member; and
a third member coupled to a drive rod and to the second member, the drive rod being connected to the connecting rod, wherein actuation of the third member results in the second member moving with respect to the first member;
wherein the bearing member facilitates the movement of the second member with respect to the first member.

15. The ladder rack of claim 14 wherein the first assembly further comprises a downwardly extending arm attached to the second member and configured to lower the first assembly from the second, lowered position to a third, fully extended position.

16. The ladder rack of claim 15 further comprising a lever and a pull handle positioned on downwardly extending arm, the lever being configured to release the pull handle and allow the arm to be lowered to the third, fully extended position.

17. The ladder rack of claim 14 wherein the second member includes a locking mechanism configured to lock the first and second assemblies in the first, raised position.

18. The ladder rack of claim 14 further comprising a damper connected to each of the first and second assemblies to dampen the movement of the assemblies between the first, raised position and the second, lowered position.

19. A method of raising and lowering a ladder rack, the method comprising:
providing a ladder rack having a first assembly and a second assembly configured to be mounted on a top of a vehicle, the first assembly and the second assembly being connected by a connecting rod, wherein the first and second assemblies are configured to move between a first, raised position and a second, lowered position, an elongated handle operatively coupled to the connecting rod via an extension rod, and a coupler for securing the elongated handle to the extension rod, the coupler interacting with the extension rod to limit rotation of the handle when the first and second assemblies move between the first, raised position and the second, lowered position;
wherein each of the first and second assemblies comprises:
a support member configured to be fixedly secured to the vehicle, the support member having a first end and a second end;
a load carrying member configured to be engaged with the support member, the load carrying member having a first and a second end; and
an actuation member configured to rotate with the connecting rod and connected to the load carrying member;
rotating the elongated handle in a first direction, thereby causing the actuation member of each assembly to rotate from a first substantially horizontal position through a vertical position to a second substantially horizontal position with respect to the respective support member, the rotation of the actuation member causing the respective load carrying member to slide downwardly with respect to the respective support member until the load carrying member is in the second lowered position, where the second end of each load carrying member is adjacent to the first end of the respective support member.

20. The method of claim 19 further comprising providing a downwardly extending arm attached to one of the load carrying members, the downwardly extending arm including a lever and a pull handle;
actuating the lever to release the downwardly extending arm; and
pulling the pull handle downwardly to lower the downwardly extending arm from the second lowered position to a third, fully extended position.

21. The method of claim 19 further comprising rotating the elongated handle in a second direction, thereby reversing movement of each of the first and second assemblies and raising the ladder rack to the first, raised position.

22. The method of claim 21 wherein the second direction is opposite to the first direction.

23. The method of claim 19 wherein the rotation of the elongated handle in the first direction stops while the ladder rack is being lowered to the second, lowered position.

24. The method of claim 21 wherein the rotation of the elongated handle in the second direction stops while the ladder rack is being raised to the first, raised position.

\* \* \* \* \*